H. F. KNAPP.
Railway Air-Brake.
No. 204,440. Patented June 4, 1878.
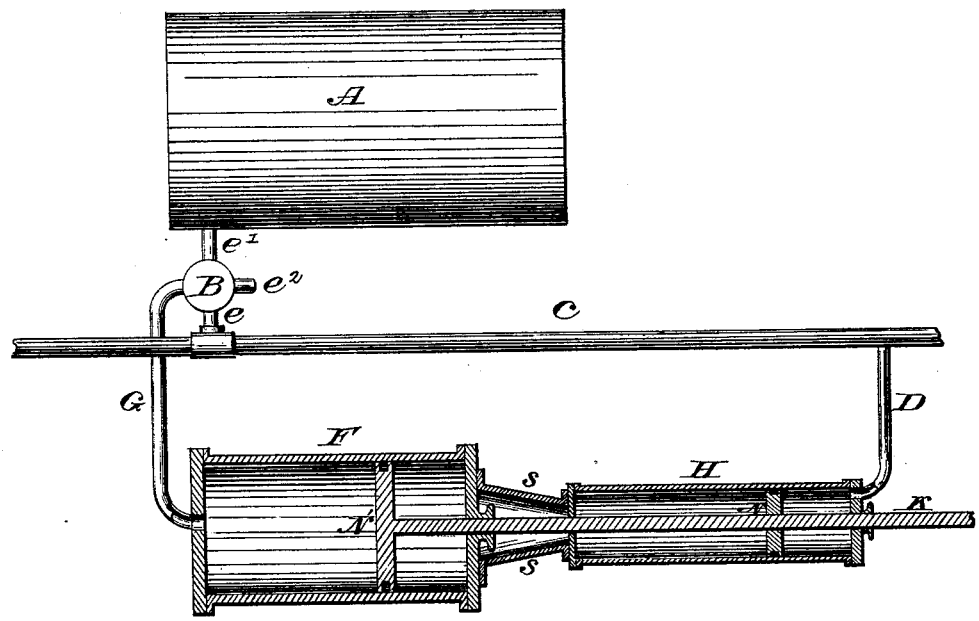
Attest:
James Ledger
William Carson
Inventor:
Henry F. Knapp

UNITED STATES PATENT OFFICE.

HENRY F. KNAPP, OF NEW YORK, N. Y.

IMPROVEMENT IN RAILWAY AIR-BRAKES.

Specification forming part of Letters Patent No. 204,440, dated June 4, 1878; application filed July 23, 1877.

*To all whom it may concern:*

Be it known that I, HENRY F. KNAPP, of the city, county, and State of New York, have invented a new and useful Improvement in Railway Air-Brake Apparatus, which improvement is fully set forth in the following specification, reference being had to the accompanying drawing.

The object of this invention is to do away with the use of springs in releasing the brakes of a train and drawing the shoes away from the wheels. Springs have hitherto been a common means for taking off the brakes of a train; but as they are of such uncertain and varying tension, they frequently fail to properly perform this function, thereby causing delay of train as well as excessive wear and tear to the rolling-stock and rails by constant and wasteful friction. To insure their action it is customary to give them far greater tension and pressure than the work they have to do actually requires, and notwithstanding their great preponderating pressure they frequently fail to operate, while their power or pressure is a direct resistance to the force required to put the brakes on, thereby proportionately destroying or neutralizing a force that is only got at great cost.

This invention is designed to work with the compressed-air brake in general use, and as the operation of that brake is so well known it is only necessary to describe this invention and the manner in which it works in connection with that brake.

This invention, together with the apparatus it is designed to work with, is illustrated by the accompanying drawing, partly in section. The apparatus, as shown in the drawing, is placed complete under each car, while the main supply-pipe C runs the entire length of the train to carry the compressed air from the pump on the engine.

A is a reservoir, and B a four-way cock. This cock works automatically in such a manner that, as long as compressed air is being forced through pipe C at a greater pressure than the air already in the reservoir A, such compressed air will pass from pipe C through the four-way cock B by pipes $e$ and $e^1$ and enter into the reservoir A, and is there stored up in reserve; but when it is desired to stop the train the engineer allows the air to escape from pipe C backward toward the engine, thereby reducing the air-pressure in pipe C and allowing the preponderating pressure in the reservoir A to so operate the cock B (automatic) that the air will pass from the reservoir by pipe $e'$ and cock B into the brake-cylinder F by way of pipe G, and thereby press out the brake-piston N' and cause the piston-rod K, to which is attached the brake-lever, to put on the brakes, and thus stop the train. Now, when it is desired to take the brakes off, the engineer simply again forces the air through pipe C, and the valve B is reversed thereby, and the air from pipe C again enters the reservoir, and by the same move of valve or cock B the air that has already been used to put the brakes on is allowed to escape from the brake-cylinder F by way of pipe G and escape-pipe $e^2$ into the atmosphere; but the brakes will not go off yet on account of the friction of the piston and working parts of the general gear. Therefore, instead of using spring-power to force back the apparatus, I tap a branch pipe, D, into the main supply-pipe C, which pipe will furnish compressed air to the opposite side of the brake-cylinder piston, and thus force it back; and, of course when it is desired to put on the brakes again, as before described, this air will escape back again through pipe D, and escape along with the air in pipe C, so that there is no resisting or counteracting pressure whatever, either in putting the brakes on or taking them off, and the action for either operation is most positive.

Now, it is obvious that but a small part of the pressure required for putting on the brakes will take them off, and, as the area in both sides of the piston N' is quite equal in capacity, more air would be used than necessary for forcing back the brakes by using cylinder F. Therefore I prefer to attach a smaller sized cylinder, H, to the apparatus, and by means of its piston N, which is fastened to piston-rod K of piston N', thus force back the whole apparatus by permitting the compressed air to enter cylinder H in its opposite end to where the air enters cylinder F for putting on the brakes. These two cylinders may be attached together by standards S.

I claim—

In an air-brake apparatus, the combination of the pipes D, C, and G with the cylinders F H and reservoir A, arranged and operating as and for the purpose described.

HENRY F. KNAPP.

Witnesses:
JAMES LEDGER,
WILLIAM CARSON.